Dec. 23, 1952        A. R. CORNUT        2,622,497
REFLEX SIGHTING DEVICE, INCLUDING FOLDING COVER SECTIONS
Filed June 15, 1949        2 SHEETS—SHEET 1
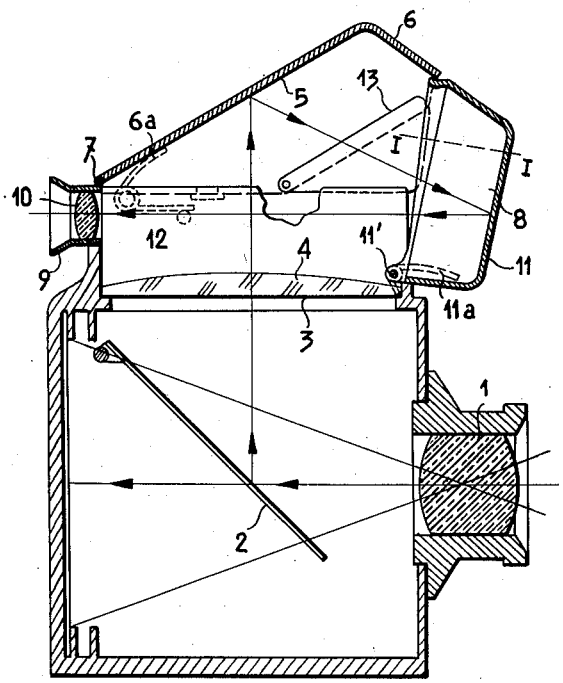
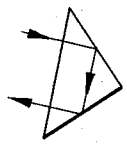
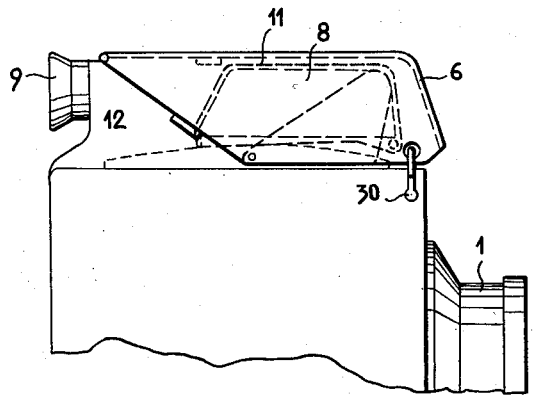
INVENTOR
Andre R. Cornut.
BY
ATTORNEY Dec. 23, 1952     A. R. CORNUT     2,622,497
REFLEX SIGHTING DEVICE, INCLUDING FOLDING COVER SECTIONS
Filed June 15, 1949                                2 SHEETS—SHEET 2
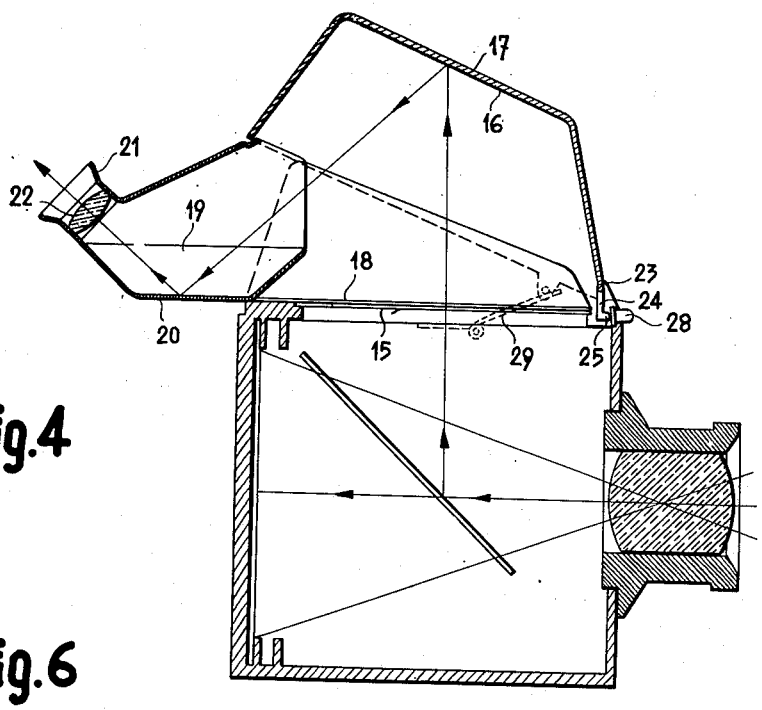
Fig.4
Fig.6
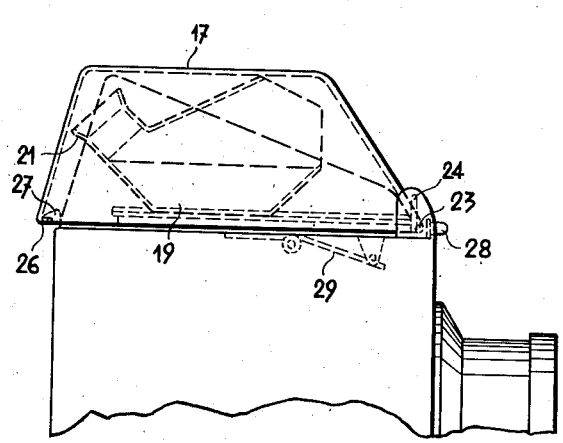
Fig.5
INVENTOR
Andre R. Cornut.
BY
ATTORNEY Patented Dec. 23, 1952

2,622,497

UNITED STATES PATENT OFFICE 2,622,497

REFLEX SIGHTING DEVICE, INCLUDING FOLDING COVER SECTIONS

André Robert Cornut, Ballaigues, Switzerland, assignor to Pignons S. A., Ballaigues, a corporation of Switzerland Application June 15, 1949, Serial No. 99,306
In Switzerland July 3, 1948

5 Claims. (Cl. 95—42)

In monocular or binocular reflex apparatus, the image is formed, by the objective and the mirror at about 45°, in a plane generally perpendicular to the plane of the film. It is generally examined either by means of an optical system designed to enlarge it directly, or with an inclined mirror allowing it to be seen parallel to the optical axis of the apparatus. These devices offer the very great drawback of seeing the image reversed from left to right, so that it is practically impossible to catch moving objects in the reflex. On the other hand, height sighting for non square sizes is nearly impossible, because the direction of movement to be imparted to the apparatus in order to obtain the desired centering of the images appearing on the reflex is the reverse of the direction of the real movements.

There also exist prismatic devices of the Amici roof type, the Porro carrier type, etc., adapted to the reflex photographic apparatus and designed to erect the image in all directions. The drawback of these prisms is their high cost, due to their complicated shape and their great number of faces. Their weight is also heavy, and though they are suitable for small sizes, it is out of the question to mount them on apparatus measuring 4½ x 6, 6 x 6, 6 x 9, or more, which they would weigh down far too much.

The object of the invention is a reflex sighting device designed for the examination of the image, enlarged and erected from left to right, formed on the ground glass by the objective and mirror of the reflex apparatus. This device comprises a mirror and a roof prism, at least one of which is mounted on a movable member on the body of the apparatus, the members supporting the mirror and the roof prism being relatively arranged in such a way that they may be folded over each other in order to reduce bulk during transport.

The accompanying drawings show by way of example two embodiments of the invention.

Fig. 1 shows a sectional elevation of a first embodiment of the invention, in sighting position.

Fig. 2 shows an elevation of this embodiment in closed position.

Fig. 3 is a section along I—I of Fig. 1.

Fig. 4 is a sectional elevation of a second embodiment of the invention in sighting position.

Fig. 5 is an elevation of this embodiment in collapsed position.

Fig. 6 is a section along II—II of Fig. 4.

In Fig. 1, the rays issuing from the objective 1 are reflected by the mirror 2 on a ground surface 3 of a sheet of glass. The latter may be surmounted by a field lens designed to ensure better lighting of the edges of the image. The ground surface may also be the lower plane surface of a lens 4. The light rays are received on a mirror 5 accommodated in the back of a cover 6 pivoting about an axis 7. The mirror 5 throws back the image against the roof prism 8 itself directed in such a way that the rays are reflected horizontally. An eye-piece 9 provided with a lens 10 allows of examining the erected and enlarged image. The prism 8 is located in a hood 11 pivoting about an axis 11', and may pivot in such a way that it rests on the ground glass surface, as will be seen in Fig. 2. A spring 11a acts on the hood 11 when it is raised and holds it in this position. A second spring 6a holds the cover 6 in a raised position. Fixed side webs 12 and movable side webs 13 integral with the cover 6 prevent surrounding light from penetrating the sighting space. A resilient closing member 30 holds closed, for transport, the cover 6 and, with it, the prism 8.

Fig. 4 is a modification in which the roof prism slides in rails 18. The image formed on the ground surface 15 is reflected by a mirrored surface 16 at the back of the cover 17. This mirror reflects the image on the roof prism 19 placed in a member 20 slidable along the rails 18. The said member 20 also supports an eye-piece 21 provided with an enlarging system 22. In order still further to reduce the bulk of the system, the axis 23 of the cover 17 may slide in side slots 24 which are fixed and provided with a hooking device 25 in which the axis 23 engages when the cover 17 is folded, as shown in Fig. 5. The cover 17 is prevented from rising by a shoulder 26 engaged by a fixed saw-tooth hook 27. When the button 28 is pushed, the axis 23 is pushed back and the shoulder 26 is released, thus allowing the spring 29 to operate and raise the cover 17. The eye-piece 21 and the prism 19 may then be slid into sighting position.

These two embodiments are represented by way of example, but it is obvious that they may be modified. For example, provision may be made for one only of the members carrying the mirror or the prism to be movable relatively to the other. Levers may also be provided for connecting the two movable members in order to synchronize their movements.

As will be seen from the drawing, the roof prism used for erecting the image is small, so that even for a large size, it does not inordinately weigh down the apparatus.

I claim:

1. In a reflex sighting device the combination comprising a frame, a ground sheet of glass horizontally disposed in the frame parallel to the objective axis, cover means movably mounted on the frame above the sheet and including at least two sections movable relatively to one another and each having a cavity, one of the sections being receivable into the other section, the sections being also movable to operable, view finding position and engaging one another at their rims in such position to exclude light and dust, a roof prism in one of the sections and a mirror in the other section and inclined to the sheet and prism when in view finding position, the mirror in the view finding position receiving the light passing through said sheet and reflecting it on the prism, and an eye piece mounted on the roof prism section and having an axis inclined to the plane of the sheet.

2. The combination according to claim 1 and wherein the other section receiving the first section is pivotally mounted on the frame above the sheet.

3. The combination according to claim 1 and also comprising yieldable means urging one of the sections to operable, view finding position.

4. The combination according to claim 1 and also comprising yieldable means urging the section receiving the first one to operable, view finding position.

5. The combination according to claim 1 and also comprising guide means mounted parallel to the sheet and guiding the first section into and out of the other sections.

ANDRÉ ROBERT CORNUT.

REFERENCES CITED

The following references are of record in the file of this patent:

UNITED STATES PATENTS

| Number | Name | Date |
|---|---|---|
| 2,165,903 | Nuchterlein | July 11, 1939 |
| 2,294,445 | Bressler | Sept. 1, 1942 |
| 2,323,005 | Bertele | June 29, 1943 |
| 2,479,291 | Baer | Aug. 16, 1949 |
| 2,512,772 | Haeseler | June 27, 1950 |

FOREIGN PATENTS

| Number | Country | Date |
|---|---|---|
| 556,783 | Germany | Jan. 28, 1933 |
| 590,770 | Germany | Jan. 9, 1934 |
| 635,267 | Germany | Sept. 14, 1936 |